Oct. 15, 1968

C. G. ROBINSON 3,406,241

METHOD AND APPARATUS FOR BALANCING THE ARC POWER OF A DIRECT
ARC ELECTRIC FURNACE AND PROTECTING THE REFRACTORY
LINING IN THE HOT SPOTS OF THE FURNACE

Filed March 10, 1967

INVENTOR.
CHARLES G. ROBINSON

BY *[signature]* ATTORNEYS

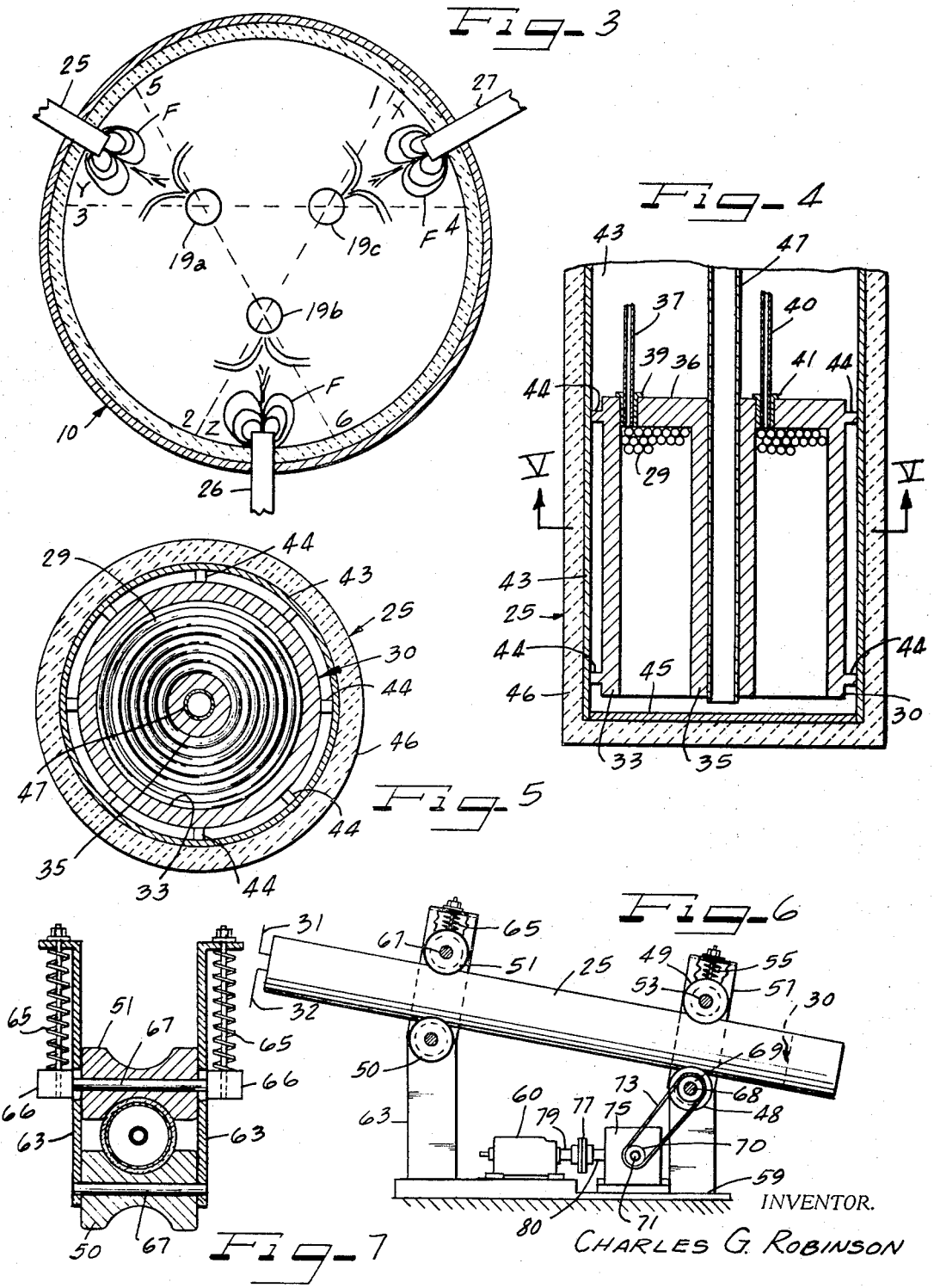

United States Patent Office 3,406,241
Patented Oct. 15, 1968

3,406,241
METHOD AND APPARATUS FOR BALANCING THE ARC POWER OF A DIRECT ARC ELECTRIC FURNACE AND PROTECTING THE REFRACTORY LINING IN THE HOT SPOTS OF THE FURNACE
Charles G. Robinson, Sterling, Ill., assignor to Northwestern Steel and Wire Company, Sterling, Ill., a corporation of Illinois
Filed Mar. 10, 1967, Ser. No. 622,321
12 Claims. (Cl. 13—11)

ABSTRACT OF THE DISCLOSURE

Method and apparatus for improvement of the heat balance and increasing the life of the lining of a multi-electrode direct arc electric furnace. Magnetic probes are introduced into the furnace along the hot spot areas of the furnace to repel the effects of the arcs from the side wall of the furnace in the region of the hot spot areas of the furnace. The magnetic probes besides repelling the arcs from the side wall of the furnace also broaden the arcs and thereby more evenly distribute the heat inside of the furnace, with a resultant decrease in the melting time of the charge.

Background of the invention

In direct arc multi-electrode electric furnaces, in which the electrodes are delta arranged, the radiation force of the arcs, forces the arcs to the wall of the furnace along an arc flare zone, flaring outwardly from the electrode to the wall of the furnace in a relatively small area. These areas have been termed the hot spot areas of the furnace. This flare is due to the Maxwell effect of a circuit tending to expand itself with current, energizing the electrodes, and has resulted in an unequal arc power, causing the hot spot areas in the furnace, and also creating an unequal heat balance throughout the area of the furnace. Although many approaches have been made to balance impedances and reactances, the unevenness of refractory wear has still been present.

The control of the refractory wear in the hot spot areas of the furnace has been attained by the injection of steam, or water converted into steam, by the heat of the arc into the furnace, directly into the hot spot areas. This has greatly prolonged the life of the lining of the furnace in the hot spot areas and has materially contributed to equalizing the heat balance in the furnace. Such a control of the hot spot areas is shown and described in my Patent No. 3,264,094 dated Aug. 2, 1966.

The present invention is directed to a similar end as that of my Patent No. 3,264,094, but attacks the problem by applied magnetics, with a view toward attaining a more uniform heat balance in the furnace to thereby recoup more of the arc power normally directed to the side wall of the furnace in the hot spot areas of the furnace.

Summary of the invention and objects

The present invention is carried out by the insertion of magnetic probes in the hot spot areas of the furnace adjacent each arc of a multi-electrode direct arc electric furnace during the melting cycle, to repel the arcs from the hot spot areas of the furnace and disperse the arcs over a more uniform area of the furnace than formerly.

A principal object of the invention is to provide a simple and improved method and apparatus for obtaining a more uniform wear on the refractory lining of an electric furnace by utilizing the principles of applied magnetics to repel the arcs from the side walls of the furnace.

Another object of the invention is to provide a method and apparatus for balancing the products of the arc power distribution in an electric furnace caused by an unequal phase impedance, to decrease the melting time of any charge within the furnace and reduce the wear of the refractory lining of the furnace.

A further object of the present invention, therefore, is to repel the effects of the electric arc in the hot spot areas of a multi-phase direct arc electric furnace and thereby increase the life of the furnace lining in these areas by inserting magnetic probes into the furnace in the region of each electrode of the furnace.

Another object of the invention is to eliminate the hot spot areas of an electric furnace and to improve the melting of any given furnace, by inserting magnetic probes in the furnace in the hot spot areas, and by energizing the magnetic probes to generate magnetic fields inversely to the magnetic fields generated by the arcs, to repel the arcs from the lining of the furnace and broaden the arcs to attain a more uniform heat distribution.

These and other objects of the invention will appear from time to time as the following specification proceeds and with reference to the accompanying drawings.

Description of the drawings

FIGURE 3 is a diagrammatic horizontal sectional view taken through the furnace shown in FIGURES 1 and 2, and illustrating the repulsion of the arc patterns by the magnetic probes.

FIGURE 4 is a diagrammatic longitudinal sectional view taken through a form of magnetic probe constructed in accordance with the principles of the present invention.

FIGURE 5 is a sectional view taken substantially along line V—V of FIGURE 4.

FIGURE 6 is a diagrammatic view illustrating a form of mounting for a probe and a means for advancing the probe into and withdrawing the probe from the furnace; and FIGURE 7 is a vertical sectional view taken substantially along line VII—VII of FIGURE 6.

Figure 1:
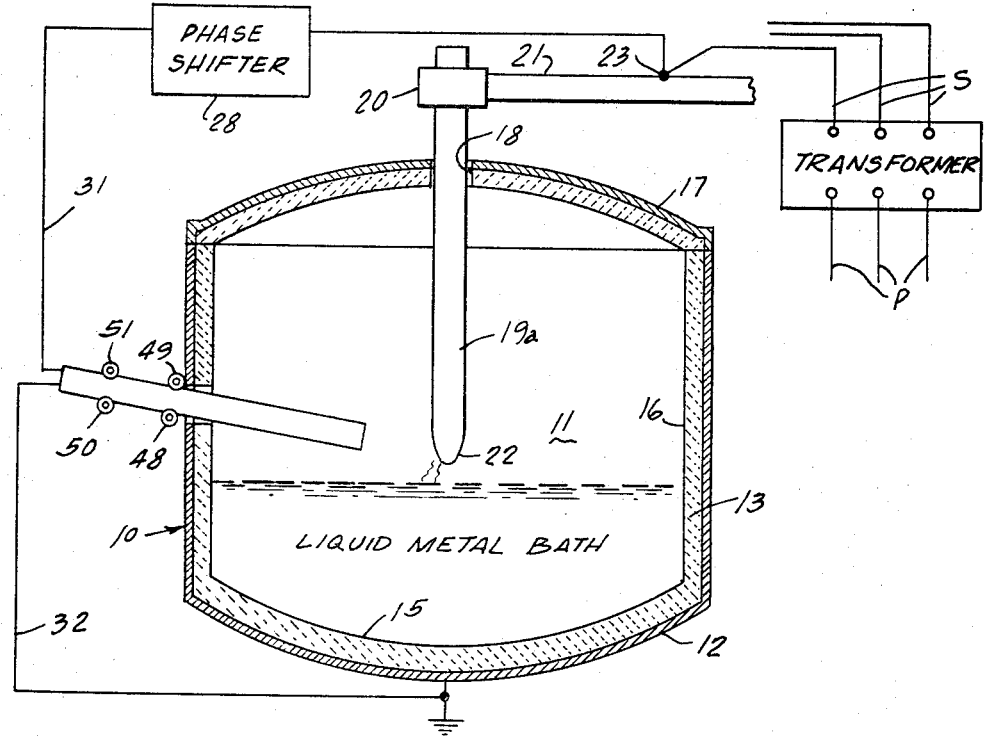
FIGURE 1 is a diagrammatic partial vertical sectional view taken through an illustrative form of three-phase electric furnace showing one electrode in the furnace and a magnetic probe in position to repel the arc from the side wall of the furnace.

Description of the preferred embodiment of the invention

The principles of the present invention are particularly applicable to conventional three-phase direct arc melting furnaces or vessels, although they may be applied to any direct arc heating vessel for melting ferrous and nonferrous metals.

The general design of the three-phase arc type furnace shown in the drawings is that of any conventional furnace construction, and for that reason the furnace is herein shown in diagrammatic form only. The furnace is generally indicated by reference numeral 10 and it will be understood that the furnace is conventionally in the form of a refractory lined vessel comprising a heating chamber 11 provided, for example, by a steel bowl 12 with a refractory lining, such as is shown at 13. The furnace 10 has a hearth 15, which is a shallow bowl formed in the refractory of the bottom lining, and further has a generally cylindrical side wall 16 extending upwardly from the hearth 15 and terminating into a roof 17, apertured at 18, to form one or more port openings through which vertical carbon or graphite electrodes 19$^a$, 19$^b$ and 19$^c$ extend. The electrodes 19$^a$, 19$^b$ and 19$^c$ are each shown in FIGURES 1 and 2 as being carried in a clamp or holder 20, which may be adjustably mounted on an arm 21 on the outside of the furnace, to space the ends of the electrodes into proper spaced relation with respect to the melt in the furnace. The clamp 20 may be vertically moved by a winch and rope system, motor driven, or may be actuated by any other form of automatic electrode advancing mechanism, such as is used in the conventional direct arc electric furnace, and is no part of the present invention so need not herein be shown or described further.

Any conventional form of charging means may be provided to charge the furnace, such as a top charge type of mechanism (not shown) to accommodate a charge of metal to be melted, to be supplied into the heating chamber 11 for the top of the furnace. The furnace also may have a conventional tap opening (not shown).

The electrodes 19$^a$, 19$^b$ and 19$^c$ each have a tip 22, which extends into the heating chamber 11 into proximity with the charge of metal in the hearth 13, for reducing the charge of metal into a liquid metal bath. In order to draw and maintain an arc between the tips 22 of the electrodes 19 and the charge, a conventional electrical circuit means is provided. As shown in FIGURE 1, a transformer has a primary circuit P connected to the usual source of electrical energy. A secondary circuit S of the transformer is connected to the electrode 19$^a$, as at 23. In order to give stability to the circuit with the charge, a reactance (not shown) may be included in the primary circuit of the transformer. The electrodes 19$^b$ and 19$^c$ are connected to the secondary of the transformer in a similar manner.

The electrodes 19$^a$, 19$^b$ and 19$^c$ may be generally cylindrical columns of graphite or carbon, and may be hollow or solid, such electrodes, however, usually being hollow.

Figure 2:
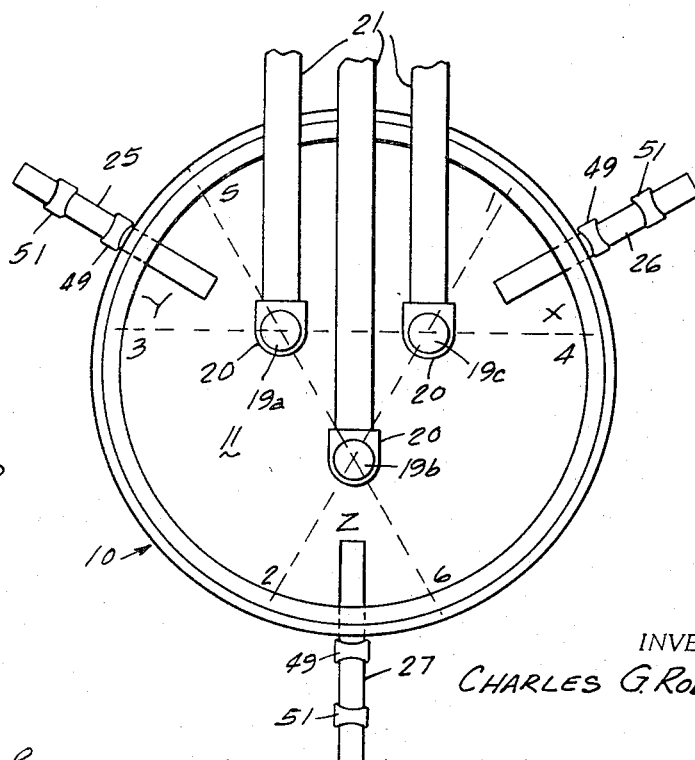
FIGURE 2 is a diagrammatic top plan view of an electric furnace constructed in accordance with the principles of the invention, with the roof of the furnace removed.

In FIGURES 2 and 3 of the drawings, I have shown the three electrodes as 19$^a$, 19$^b$ and 19$^c$, extending downwardly into the furnace and positioned in a delta arrangement. I have also shown by dashed lines, extending through the centers of electrodes to the furnace wall, hot spot areas X, Y and Z in the areas between the dashed lines.

In considering the hot spot area X, the limits of the area are defined by dashed lines 1 and 2 and 3 and 4. When electrode 19$^b$ is energized at maximum power the radiated force of the arc of electrode 19$^b$ will force the arc of electrode 19$^c$ to the furnace lining at point 1. Conversely, as the electrode 19$^a$ reaches its maximum power, the radiated force of the arc will force the arc of electrode 19$^c$ to the furnace wall at 4. This continues as the phase rotation requires, it being understood that each electrode reaches its maximum power approximately 120° in phase difference from the other. Thus, the arc flare zones will be in the segments of the shell 1 to 4, 2 to 6 and 3 to 5, which represent the magnetic analogy of the hot spots on the furnace shell.

Referring now to FIGURE 3 and bearing in mind that the arc is oscillating, for example, on the 19$^b$ electrode in an area that is marked Z. In this figure I have shown magnetic probes 25, 26 and 27 inserted through the furnace wall and have also shown the magnetic force lines generated by these probes, which are designated by F. Considering in particular the 19$^b$ electrode, the arc force is designated by force lines A and is split by the magnetic force of the probe 26 and rebuffed from the wall of the furnace. Considering that the arc is sweeping for example zone Z, from 2 to 6, as the arc sweeps across the magnetic field generated by the probe 26, the magnetic field F will repel the arc and prevent the arc from jetting directly or tangentially out to the furnace wall.

Each magnetic probe 25, 26 and 27 is of a similar construction so that magnetic probe 25 need only be shown and described in detail herein. The magnetic probe 25 is shown in FIGURES 4 and 5 as having an electromagnetic coil 29 wound on a core 30. The probe 25 is shown in FIGURE 1 as being energized through a conductor 31 connected with the conductor energizing the electrode 19 at 23. A conductor 32 is connected from the probe 25 to ground. The other probes 26 and 27 are connected to the respective leads leading to the electrodes 19$^c$ and 19$^b$ in a similar manner. In order that the flux from the coil 29 in the tip of the magnetic probe will be 180° magnetically out of phase with the arc of the associated electrode, the coil 29 is wound in the core 30 in such a direction that the magnetic flux at the tip of the probe will repel the magnetic flux generated by the arc. A phase shifter 28 may also be connected in the conductor 31 to magnetically vary the magnetic phase relationship between the probe and the arc.

The phase shifter may be of any conventional form and is no part of the present invention so need not herein be shown or described further. In FIGURES 4 and 5 of the drawings I have diagrammatically shown the leading end portion of the magnetic probe 25, and have shown a section of the core 30 of said probe having the electromagnetic coil 29 wound in the annular space between the outer wall 33 of the core and an inner annular wall 35 thereof. The core 30 may be made from iron and has an end wall 36 closing the inner end of the core, through which a hollow copper conductor 37 leads. The copper conductor 36 is insulated from the end wall 36 of the core by an insulating bushing 39. The conductor 37 may have direct connection with the coil 29. The coil 29 is also shown as being hollow to accommodate a coolant to be passed therethrough. The coil 29, for illustrative purposes is only partially shown, although it is understood that said coil is wound for the length of the core. The opposite end of the coil 29 is connected with an insulated hollow conductor 40 extending through an insulated bushing 41 in the end wall 36 of the core. The coil 29 and the conductors 37 and 40 are electrically connected with the respective conductors 31 and 32 and may have coolant passed therethrough in a conventional manner. The core 30 is housed in a steel casing 43 and is spaced inwardly of the interior wall of said casing by spaced radially extending spacer lugs 44. The casing 43 is closed at its inner end by an end wall 45 and is coated with a refractory coating 46 extending for substantially the length thereof and across the inner end thereof. A water inlet 47 leads through the center of the interior wall portion 35 of the core 30 to circulate cooling water along the face of the coil 29. The coolant is returned along the space between the core and casing. This circulation of coolant and refractory coating of the casing is to insure against burning up of the core in the environment of the furnace, the temperature of which will be 3000° F. in the melting zone of the furnace.

By way of example and not limitation, a water cooled magnetic probe 16 inches in diameter and 20 feet long has been made for experimental purposes. The outer refractory lining of the probe was made from a high alumina refractory. The probe was energized with currents in the order of 3000 amperes. The magnetic flux plot from this probe is generally like those shown diagrammatically in FIGURE 3 of the drawings.

The probe 25 is shown in FIGURES 1, 6 and 7 as mounted between a pair of vertically spaced feed rollers 48 and 49 and a pair of radially outwardly spaced idler rollers 50 and 51. The feed rollers 48 and 49 and idler rollers 50 and 51 support the probe 25 to be inclined downwardly toward the tip 22 of the electrode 19ᵃ, as the probe enters the furnace.

The feed rollers 48 and 49 have concave peripheries generally conforming to the periphery of the probe. The roller 59 is shown in FIGURE 7 as being an idler roller mounted on a shaft 53 for free rotation with respect thereto and pressed into engagement with the periphery of the probe by compression springs 55. The springs 55 may engage opposite ends of the shaft 53. The shaft 53 is mounted in slots (not shown) extending along support brackets 57 for the rollers. The brackets 57 may extend upwardly of a base 59 for a motor 60.

The idler rollers 50 and 51 are of the same form as the feed rollers and are mounted between support brackets 63, in a manner similar to which the feed rollers 48 and 49 are mounted in the support brackets 57. Compression springs 65 are seated on bearing blocks 66 on opposite ends of an idler shaft 67, to maintain the rollers in engagement with the probe.

The feed roller 48 is mounted on a shaft 68 journalled in the brackets 57 and has a sprocket 69 on an end thereof, driven from a sprocket 70 on the end of a speed reducer drive shaft 71, through a drive chain 73.

The speed reducer drive shaft 71 is housed in a housing 75 for the speed reducer and is driven through conventional speed reducer gearing (not shown) journalled within said housing. A coupling 77 serves as a drive coupling connecting a shaft 79 of the motor 60 to a shaft 80, forming a drive shaft for the speed reducer.

The probes 26 and 27 are mounted in the same manner as the probe 25 and are moved into and out of the furnace with the probe 25 to position the probes in a desired relationship with respect to the electric arc and to withdraw the probes when charging the furnace.

In charging the furnace, where the charge enters the furnace from the top, the probes are withdrawn from the furnace during charging so as not to be damaged by the scrap or ore falling into the furnace. When the melting cycle is started, and during the first few minutes of the melting process, there will be cool scrap against the furnace wall. During this period there will be no need to insert the probes. As the furnace continues its melt, however, due to the arc flare, the scrap is first melted in the areas X, Y and X shown in FIGURES 2 and 3 and as it is melted, the side wall of the furnace in these areas is exposed to the intense heat of the arc plasma. The probes are now positioned inwardly of the wall of the furnace toward the arcs a distance suitable to rebuff the arcs and split the forces of the arcs and turn the forces of the arcs away from the hot spot areas, and thereby spread the arcs to areas on opposite sides of the hot spot areas in the furnace.

While I have herein shown and described one form in which the invention may be embodied, it may readily be understood that various variations and modifications in the invention may be attained without departing from the spirit and scope of the novel concepts thereof.

I claim as my invention:

1. In a method of melting ferrous metals in a direct-arc three phase electric melting vessel having a refractory lined wall and having equally spaced delta arranged electrodes spaced equal distances inwardly from the refractory wall of the vessel, in which a ferrous charge is melted to produce a molten bath by the propagated heat attained by the high density arcs between the electrodes and the charge in the vessel, the improvements comprising, the steps of:

introducing magnetic probes through the wall of the melting vessel along the hot spot regions of the vessel and in radial alignment with the electrodes, in which the magnetic flux of the magnetic probes is sufficiently out of phase with the electric arc, to repel the arc from the hot spot region of the vessel and broaden the arc to create a more even heat balance.

2. The method of claim 1, wherein the magnetic probes are electro-magnetic and are energized 180° magnetically out of phase with the arc power of the electrodes.

3. The method of claim 2, wherein the magnetic probes are withdrawn from the melting vessel during the charging cycle and are moved radially into the vessel during the melting cycle.

4. In a three phase direct arc electric melting furnace, a melting vessel having a hearth, a cylindrical wall extending upwardly from said hearth and a roof extending over said cylindrical wall, said hearth, cylindrical wall and roof having inner refractory linings, at least three electrodes leading through the roof of the vessel to a position adjacent the hearth, said electrodes being spaced substantial distances inwardly of the wall of the melting vessel, equal distances from the wall and equal distances apart, energizing circuits to said electrodes to form and maintain confined arc zones between the tips of said electrodes and the charge in said hearth, the improvement comprising:
a magnetic probe in association with each electrode in the hot spot region of the vessel and creating a magnetic field,
the magnetic flux of which is inversely out of phase with the magnetic flux of the arc power of the associated electrode.

5. The structure of claim 4, wherein the magnetic probes are electrically energized 180° magnetically out of phase with the arc power of the electrodes.

6. The structure of claim 5, wherein each magnetic probe is mounted for movement radially of the wall of the vessel, to be withdrawn during the charge period and to be moved into the vessel during the melting cycle.

7. The structure of claim 4, wherein each probe is mounted for movement radially of the wall of the vessel toward and from the associate electrode, to be withdrawn during the charge cycle and to be advanced toward the electrode during the melting cycle, and
wherein power drive means are provided to advance and retract the magnetic probes with respect to the electrodes.

8. The structure of claim 7, wherein the probes are mounted on vertically and longitudinally spaced rollers,
wherein spring means are provided to bias the upper rollers into engagement with the probes, and
wherein a motor and drive transmission mechanism is provided to drive at least one of the lower rollers to advance the associate probe into and to withdraw the probe from the vessel.

9. The structure of claim 5, wherein each probe includes a core having an electromagnetic coil wound thereon,
wherein an elongated metal casing forms a mounting for said core and coil at the inner end thereof and encloses said core and coil, and
wherein the metal casing has a refractory coating.

10. The structure of claim 9, wherein the electro-magnetic coil is a hollow copper coil to accommodate the circulation of coolant therethrough.

11. The structure of claim 9,
wherein a water inlet conduit extends along the casing and through the center of the core for the circulation of water around and about the coil in the hollow shell.

12. The structure of claim 11,
wherein the coil is a hollow copper coil,
wherein energizing conductors to the coil are connected in the energizing circuit to the associated electrode 180° out of phase magnetically with the arc power of the electrode, and
wherein the hollow conductors and coil accommodate the circulation of coolant through the coil.

References Cited

UNITED STATES PATENTS 808,186 12/1905 Benjamin _____ 219—123
775,282 11/1904 Raddatz _____ 13—11 XR BERNARD A. GILHEANY, *Primary Examiner.*

H. B. GILSON, *Assistant Examiner.*